United States Patent [19]

Long, Jr.

[11] 3,763,540

[45] Oct. 9, 1973

[54] APPARATUS FOR INSERTING ELECTRICAL TERMINALS INTO PRINTED CIRCUIT BOARDS

[75] Inventor: Alden Owen Long, Jr., Carlisle, Pa.

[73] Assignee: AMP Incorporated, Harrisburg, Pa.

[22] Filed: Dec. 14, 1971

[21] Appl. No.: 207,803

[52] U.S. Cl. .................................................. 29/203 B

[51] Int. Cl. .............................................. H05k 13/04

[58] Field of Search ....................... 29/203 B, 203 D, 29/203 DT, 203 DTS, 203 R

[56] References Cited

UNITED STATES PATENTS 3,293,735 12/1966 Lovendusky ....................... 29/203 B

*Primary Examiner*—Thomas H. Eager

*Attorney*—William J. Keating et al.

[57] ABSTRACT

Apparatus for inserting terminals into printed circuit boards comprises reciprocable ram and transfer slide means which transfers an individual terminal from the end of a feed path to a position in alignment with the path of reciprocation of the ram. The transfer slide is formed of two sections which are resiliently biased against each other. At the loading station, an individual terminal is inserted into the transfer slide between the two sections and resiliently held while it is carried to the insertion station. Thereafter, the ram moves through an opening in the transfer slide, grasps the terminal, and carries it towards the printed circuit board into which it is inserted.

5 Claims, 12 Drawing Figures

APPARATUS FOR INSERTING ELECTRICAL TERMINALS INTO PRINTED CIRCUIT BOARDS

BACKGROUND OF THE INVENTION

A variety of machines have been devised for inserting the numerous specialized types of printed circuit board terminals into printed circuit boards. For example, the U.S. Pat. No. 3,293,735 to Lovendusky shows a device for inserting rectangular box-type terminals into a board in which the terminals are fed along one path, the leading terminal of the strip is severed from the strip and carried by an insertion ram towards a printed circuit board, the terminal being guided towards the printed circuit board by a tube through which it is pushed by the insertion ram. In other types of terminal insertion devices, the insertion ram itself functions to remove the terminal from the terminal strip and carry it directly to the board. In general, these prior art devices function satisfactorily for many types of terminals. However, it has been found that relatively simple flat, stamped terminals in strip form cannot be conveniently inserted by known types of insertion machines or modifications of such machines.

The instant invention is directed to the achievement of an improved terminal insertion apparatus which is particularly intended to insert relatively simple stamped terminals into a printed circuit board or the like. Terminals of the type with which the instant invention is concerned cannot be directly engaged by the insertion ram as can some types of terminals nor can they be fed through a guide tube and pushed through the tube by the insertion ram as can other types of terminals. The invention then, is particularly intended to provide a means for severing stamped terminals from a terminal strip and for delivering such terminals to an insertion ram in a manner such that the terminals will be accurately and precisely carried from the transfer means to the ram to the printed circuit board.

It is accordingly an object of the invention to provide an improved terminal insertion apparatus. It is a further object to provide an insertion apparatus which is particularly intended to insert relatively simple stamped terminals into a printed circuit board. It is a further object to provide an insertion apparatus which is capable of inserting a variety of types of terminals into printed circuit boards. It is a further object of the invention to provide a relatively simple and reliable insertion apparatus which can be operated without the requirement of a high degree of operator skill and which will precisely locate the terminal on a printed circuit board into which it is being inserted.

These and other objects of the invention are achieved in a preferred embodiment thereof which is briefly described in the foregoing abstract, which is described in detail below, and which is shown in the ccompanying drawing in which.

Figures 1, 2:
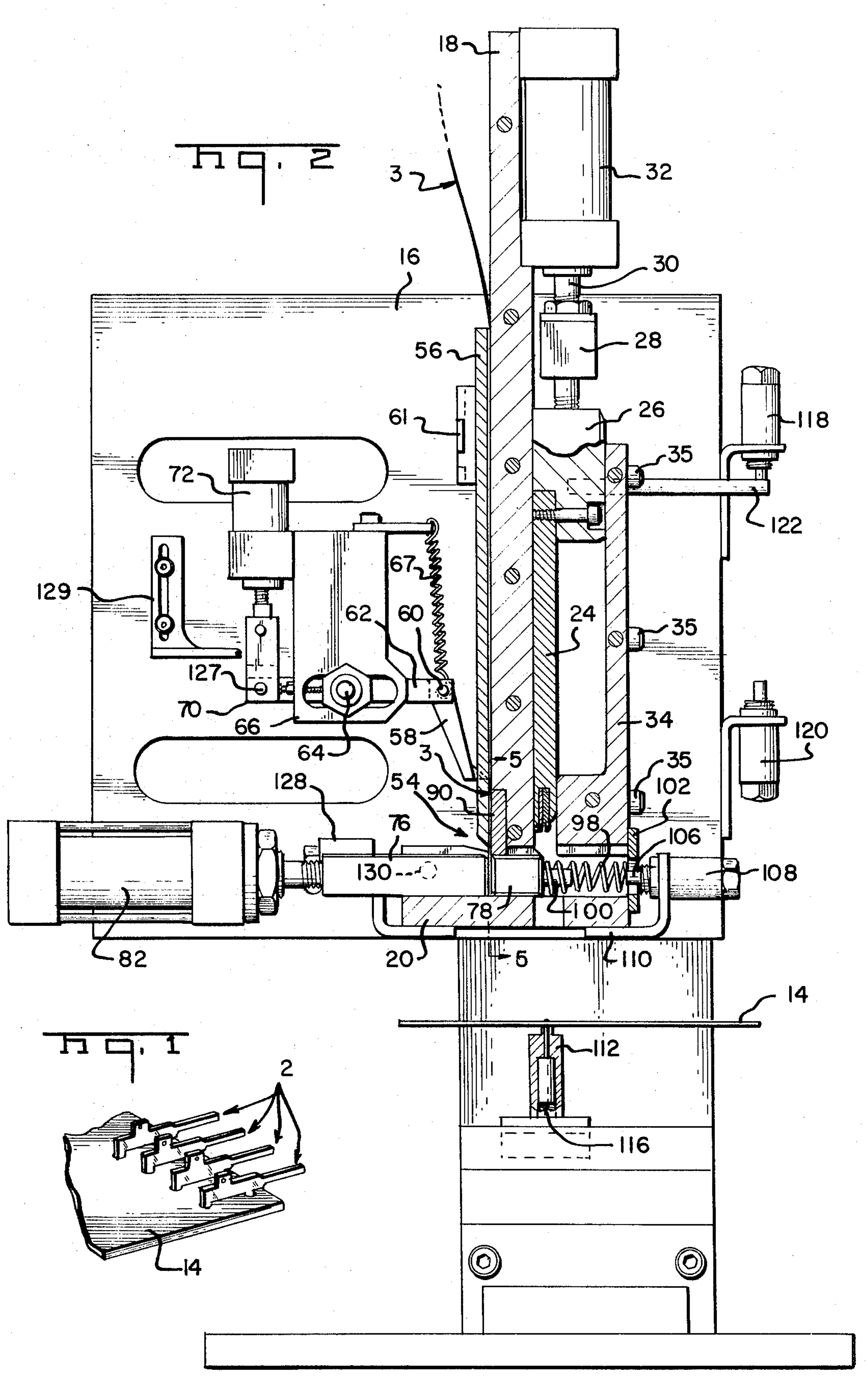
FIG. 1 is a perspective view showing terminals mounted in a printed circuit board, the terminals shown being of a type adapted to be mounted in the board by an apparatus in accordance with the invention.
FIG. 2 is a frontal view, partially in section, of an apparatus in accordance with the invention, this view showing the positions of the parts in the beginning of an operating cycle.
Figures 5, 11, 12:
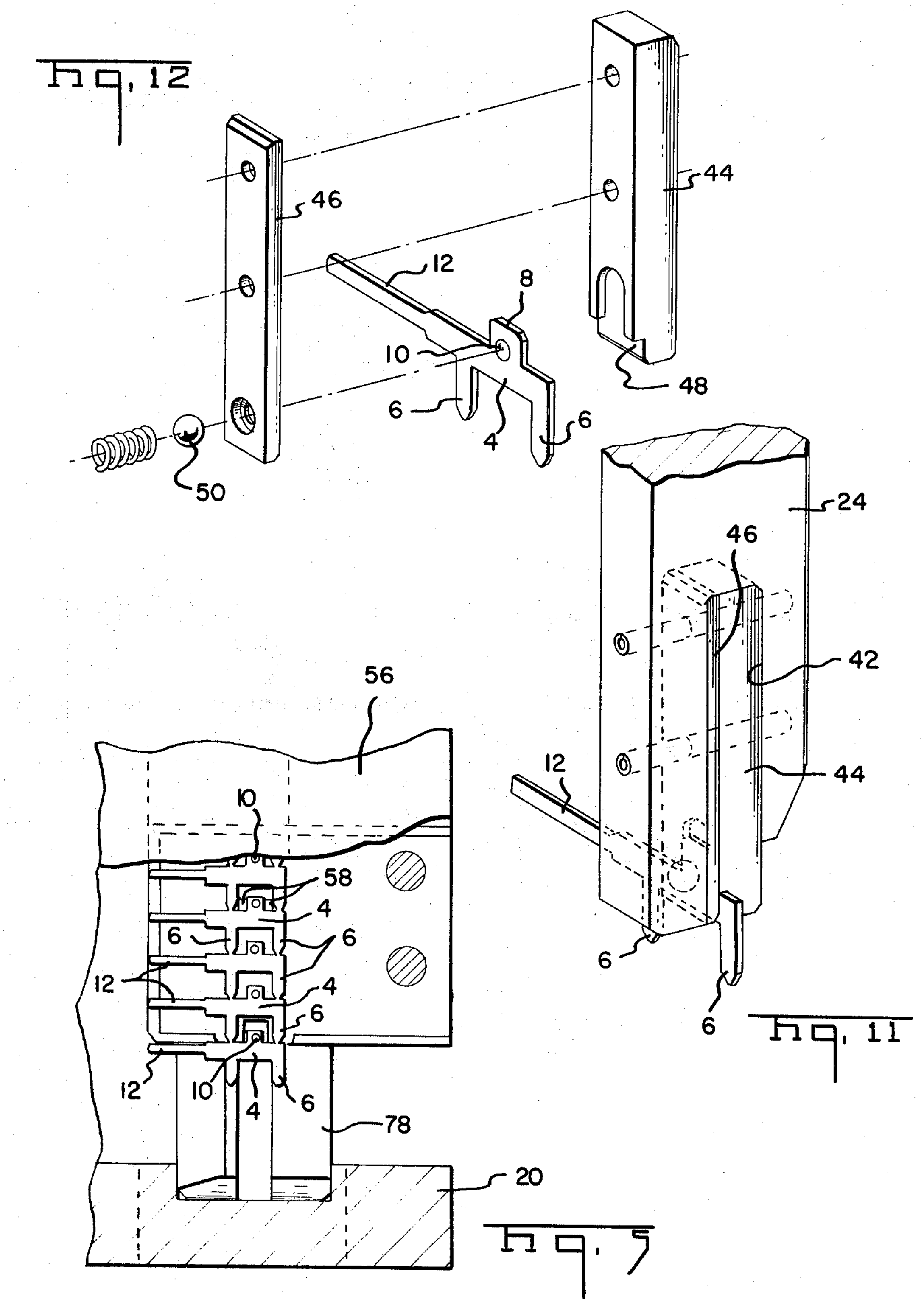
FIG. 5 is a fragmentary sectional view taken along the lines 5—5 of FIG. 2 showing the manner in which the leading terminal of the strip is loaded into the terminal transfer slide.
FIG. 11 is a fragmentary perspective view of the lower portion of the insertion ram illustrating the manner in which a terminal is held in the ram during the insertion process.
FIG. 12 is an exploded perspective view of the parts contained in the lower portion of the insertion ram which serve to hold a terminal in the ram during an inserting operation.

Referring first to FIG. 1 and 12, the disclosed embodiment of the invention is adapted to insert terminals of a type shown at 2 into a printed circuit board 14. The terminals are generally F-shaped having a body portion 4 from which a pair of spaced-apart parallel legs 6 extend and having a contact portion 12 extending axially from the body portion. The contact portion which, after insertion, extends parallel to the surface of the printed circuit board 14 is adapted to enter a complementary connector to form electrical connections between the components mounted on the circuit board 14 and external circuitry. An ear 8 extends upwardly from the body portion 4 and is embossed as shown at 10 to facilitate handling of the individual terminals during insertion as will be described below. The terminals 2 are manufactured as a continuous strip, see FIG. 5, with the lower ends of the leg portions of each terminal being integral with the upper edge of the body portion 4 of the next adjacent terminal. Terminals of this type are stamped from relatively thick metal stock and cannot be conveniently inserted by previously known types of inserting apparatus.

Figure 3:
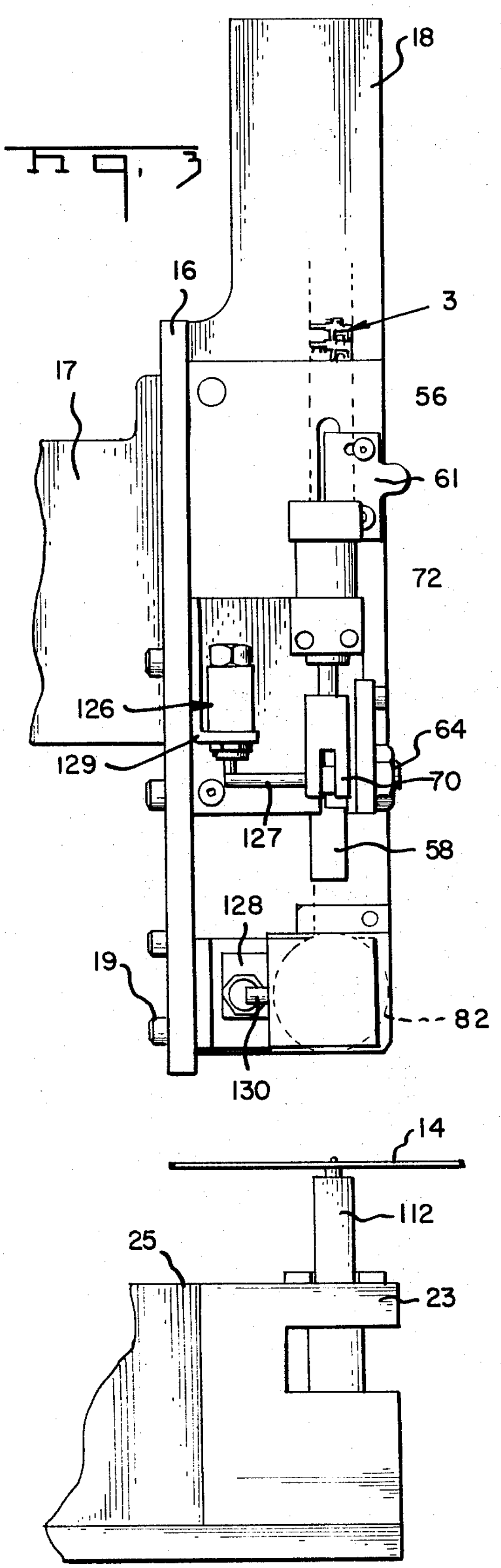
FIGS. 3 and 4 are side views of the applicator portion of the apparatus as viewed from the left and right respectively.
Figure 4:
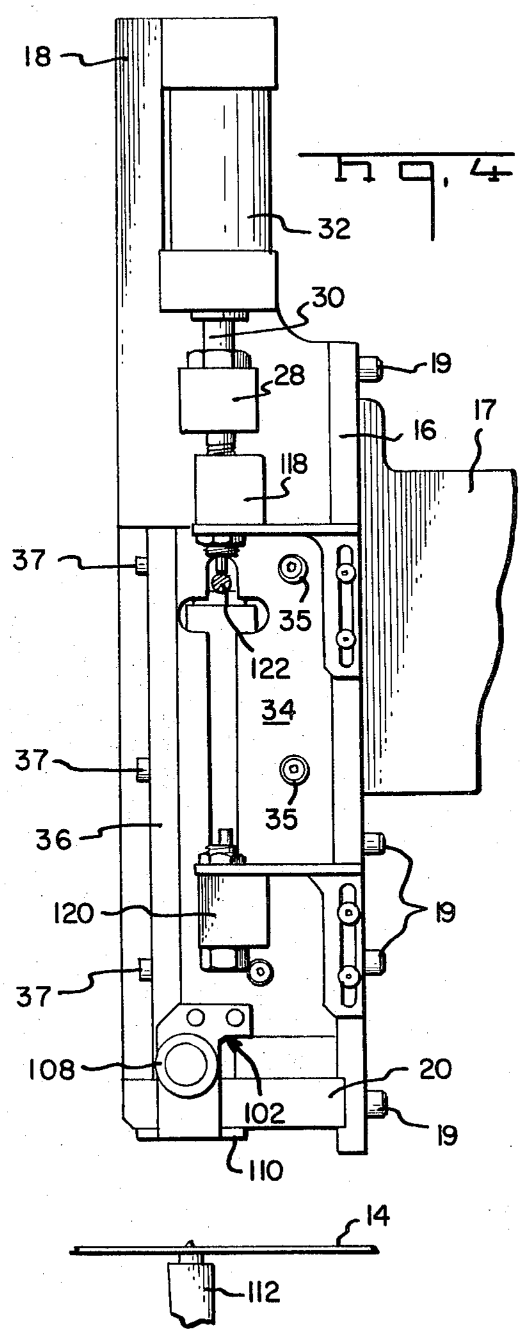

Referring now to FIGS. 1, 3, and 4, the disclosed insertion apparatus is mounted on a frame means comprising a main frame plate 16 extending in a vertical plane as shown in the drawing, a frame plate 18, also extending in a vertical plane and normally of the frame plate 16, and a horizonal plate 20 disposed in a horizonal plane beneath the frame plate 18. The main frame plate 16 is secured to the upper arm 17 of a C-shaped press frame and the frame plates 18, 20 are secured to frame plate 16 by suitable fasteners 19. A block 23, in which a printed circuit board supporting means is mounted, is secured to the lower arm 25 of the press frame as best shown in FIG. 3.

The individual terminals are inserted into the printed circuit board 14 by means of an insertion ram 24 disposed against the righthand side of frame plate 18 as viewed in FIG. 2. The insertion ram is secured at its upper end to a slide block 26, which in turn, is connected by means of a coupling 28 to piston rod 30 extending from a piston cylinder 32 mounted on the upper end of the frame plate 18. Insertion ram 24 and slide block 26 are accurately guided along a vertical path towards and away from a printed circuit board supported on a supporting means described below by a ram housing 34 and closure plate 36. The ram housing 34 is generally L-shaped in cross section as shown in FIG. 2 and is secured to the side of frame plate 18 by suitable fasteners 35, the closure plate 36 being secured to the forwardly facing side of the ram housing by fasteners 37. Accurate guiding of the ram is achieved by virtue of the fact that the slide block 26 has a loose sliding fit in the enclosure defined by the ram housing 34 and plate 36.

Figures 9, 10:
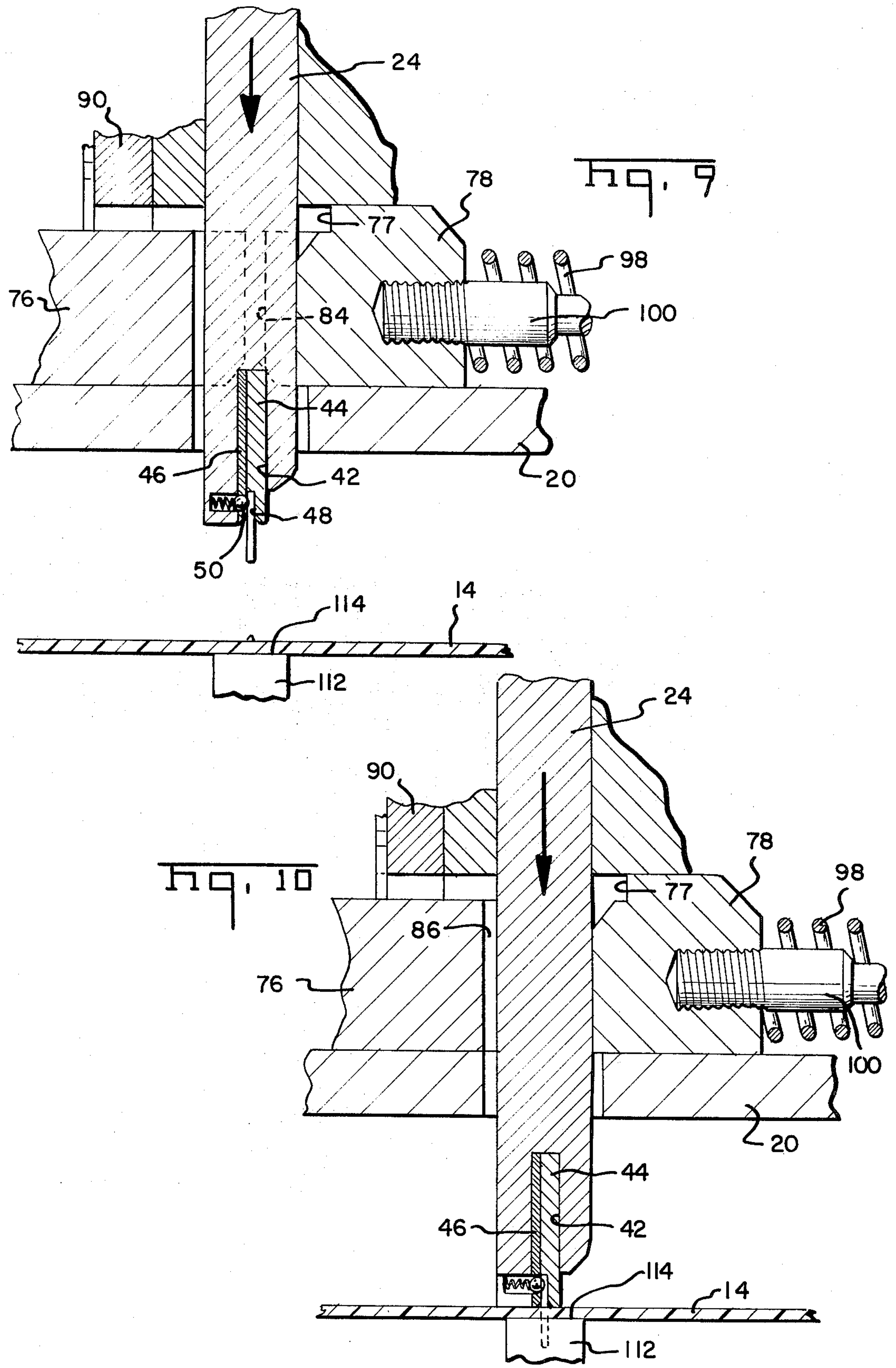
FIGS. 9 and 10 are views similar to FIG. 7 showing the movements of the parts including the insertion ram during the inserting operation.

As shown best in FIGS. 9 and 11, a transverse slot 42, is provided in the lower end of the insertion ram and a terminal holding plate 44 is secured in this slot by a suitable fastener. The holding plate 44 is provided with a transverse recess 48 and a spacer plate 46 is mounted in the slot 42 beside the holding plate 44. A steel ball 50 is mounted in a horizonal opening in the ram and is resiliently biased rightwardly as viewed in FIG. 9 against the spacer plate 46 which is provided with a hole through which portions of the steel ball extend. The width of the space between the plate 46 and the lower end of the plate 44 is substantially equal to the thickness of the terminal 2 and a central upwardly extending branch of the recess accomodates the ear 8 on the upper end of a terminal gripped in the lower end of the ram. As will be explained more fully below, the ram picks up the terminal by moving against the terminal when it is held in the transfer slide and holds the terminal during travel of the ram towards the printed circuit board.

During each operating cycle, a terminal is loaded onto the transfer slide 74 at a loading station generally located at 54 which is disposed to the left, as viewed in FIG. 2, of the insertion ram. The terminal strip 3 is fed from a suitable supply reel downwardly along a feed path which is parallel to the lefthand side of the frame plate 18. A suitable cover plate 56 is mounted on the surface of the frame plate 18 and the terminal strip is fed through a channel on the underside of this cover plate 56. Feeding of the strip is accomplished by means of a feed finger 58 pivoted at 60 on one end of a lever 62. This lever is pivotally mounted intermediate its ends 64 on a mounting plate 66 secured to the frame plate 16. The lefthand end of this lever 68 is pivoted to a yoke 70 secured to the end of a piston rod extending from a pneumatic piston cylinder 72 which is also secured to the plate 66. Lever 62 is normally biased in a counterclockwise direction as viewed in FIG. 2 by means of a spring 67, one end of which is secured to the pivot pin 60 and the other end of which is anchored to a bracket extending from the plate 66. It will be apparent that upon clockwise movement of the lever 62, the strip will be fed downwardly and viewed in FIG. 2 and, the leading terminal of the strip will be loaded into the transfer slide. During retraction of the feed finger 58, that is upon subsequent counterclockwise movement of the lever 62, the strip is prevented from retractile motion by means of a suitable drag device of the type commonly known and contained in a block 61.

Figures 6, 7, 8:
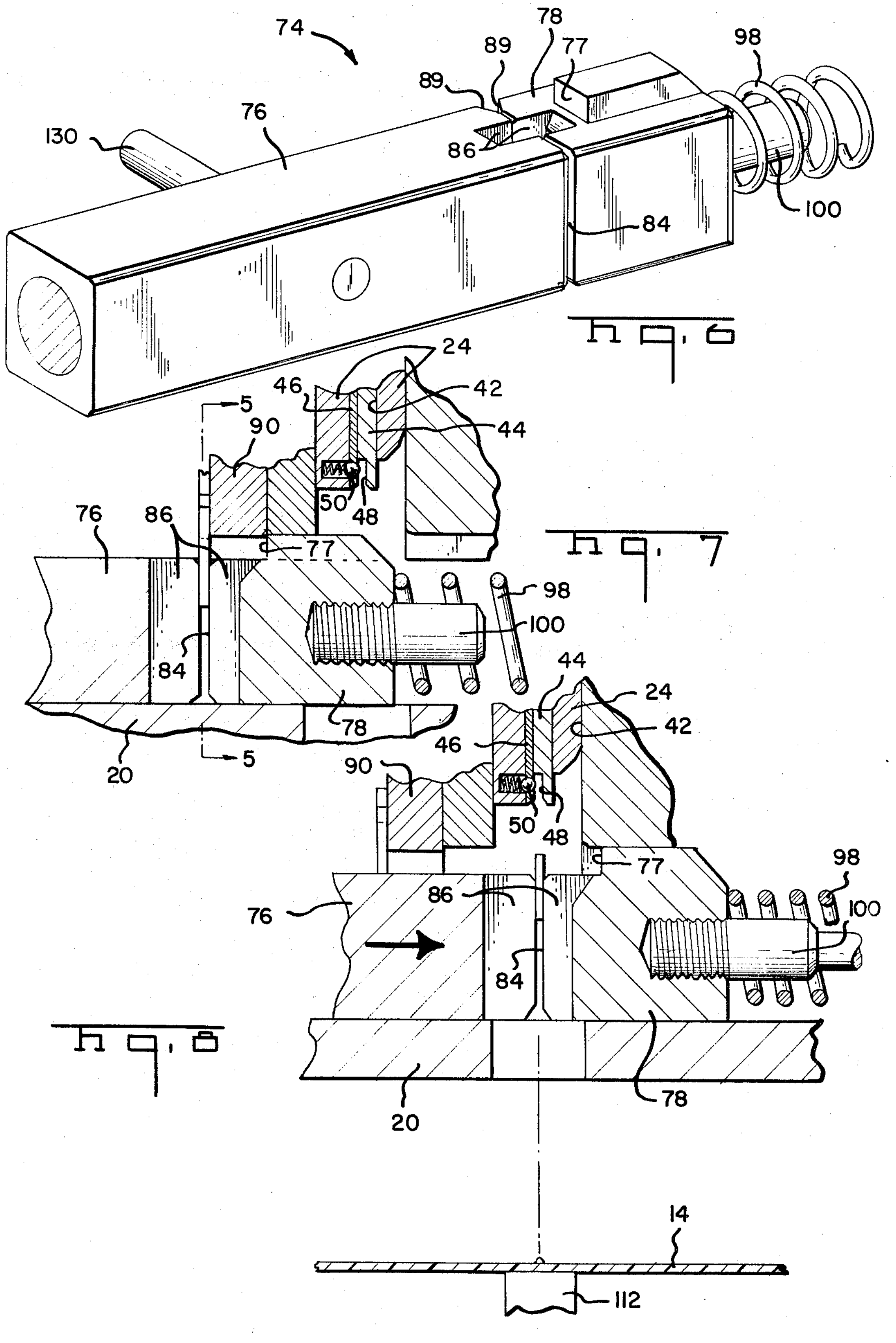
FIG. 6 is a perspective view of the terminal transfer slide.
FIG. 7 is a fragmentary sectional view taken along the lines 7—7 of FIG. 4 showing the frontal portion of the transfer slide with the slide located at the terminal loading station.
FIG. 8 is a view similar to FIG. 7 but showing the position of transfer slide after the leading terminal of the strip has been transferred to the inserting station.

The transfer slide 74, FIG. 6, is formed of 2 sections 76, 78 each of which has a generally rectangular cross section and which are disposed against each other as shown at 84. The section 76 is secured to the end of a piston rod 80 extending from a pneumatic piston cylinder 82 which in turn is mounted on the face of the frame plate 16. As will be apparent from FIG. 2, upon rightward movement of this piston rod, the transfer slide will be moved rightwardly thereby to transfer a previously loaded terminal from the loading station 54 to a position in alignment with the path of reciprocation of the insertion ram 24.

The abutting faces of the slide sections 76, 78 are provided with central recesses which define a generally rectangular opening 86 extending vertically through the transfer slide assembly. The dimensions of this opening are such that the insertion ram 24 is permitted to pass freely therethrough during its movement from its upper position towards the printed circuit board. The adjacent edges 89 of the block sections 76, 78 are beveled on the rearwardly facing side of the transfer slide assembly in order to reduce the bearing area of the slide sections on the terminal. In the absence of these bevels, there would be a greater bearing area on the contact arm side of the terminal and the terminal would tend to rotate while being pushed from the transfer slide assembly towards the printed circuit board.

The slide 74 rests on the upper surface of the plate 20 which is provided with a groove 88 to guide the slide assembly along its path of reciprocation. The two sections of the slide 76, 78 are resiliently biased against each other by means of a spring 98 which is interposed between the righthand side of the slide section 78 and a retainer plate 102 secured on the righthand side of the cover plate 34. This retainer plate extends downwardly past the path of reciprocation of the slide and is provided with a central opening 104 through which a plunger 106 of a switch 108 extends. This switch is mounted on a bracket 110 and forms part of the control circuit of the apparatus. It also should be noted that the spring 98 surrounds, at its lefthand end, a rod or projection 100 on the slide section 78 to retain the spring in position. The projection 100 also functions to close switch 108 when the slide moves to the right.

When the transfer slide 74 is in the position of FIG. 2, the two sections 76, 78 will be separated slightly by virtue of the presence of the integral stop 77 on the upper side of slide section 78. This stop engages the rightwardly facing (as viewed in FIG. 2) side of a shear plate 90 which is fastened in a recess in the frame plate 18. The slide section 78 is thus prevented from following the slide section 76 to the limit of travel of the latter slide section so that a gap is provided between the slide section of reception of a terminal. The terminal strip 3 is advanced as previously explained and the leading terminal of the strip is pushed downwardly as illustrated in FIG. 5 between the surfaces of the two sections 76, 78 of the transfer slide. When the transfer slide assembly 74 is moved rightwardly, the leading terminal is sheared from the next adjacent terminal by means of the shear block 90 mounted as shown in FIGS. 7 and 8. The shear plate 90 and the lower surface of the frame plate 18 as well as the lower portion of the cover plate 36 are provided with a central groove 92, 94 to permit passage of the upwardly projecting ear 8 of the terminal as it is transferred from the loading station to the insertion ram pickup station and to permit passage of the stop 77.

After movement of the transfer slide from the position of FIG. 2 to the position of FIG. 9, the insertion ram moves downwardly and engages the upper edge of the terminal with the upwardly projecting ear 8 of the terminal extending into the recess on the lower end of the insertion ram. Upon further downward movement of the insertion ram, the ram moves through the opening 86 in the transfer slide and carries the terminal downwardly towards the printed circuit board.

The board is supported on the upper end of a pedestal 112 having a pair of spaced apart locating pins extending through its upper surface which are adapted to enter holes in the printed circuit boards into which the terminal legs will ultimately be inserted. Between these locating pins, there is provided a supporting surface 114 against which the board is disposed by the operator. The pins are resiliently biased upwardly by springs 116 contained in the pedestal 112. The pedestal itself is adjustably mounted in a mounting block 23 secured to the lower arm 25 of the press frame.

Any suitable control system for controlling the sequence of operations may be employed. In the disclosed embodiment, there are provided switches 118, 120 on the righthand side of the insertion slide which have plungers adapted to be engaged by a rod 122 extending from the insertion slide. Thus the switch 118 is closed where the insertion slide is at the upper limit of its stroke and the switch 120 is closed when the insertion slide reaches the lower limit of its stroke. Additionally, a switch 126 is provided on a bracket 129 secured to plate 16 which is closed by the pivot pin 127 that secures clevis 70 to limb 62. An additional switch 108 is provided on a bracket 110 at the righthand end of the plate 17 and is closed by the projection 100 on the transfer slide section 88 at the end or the limit of the rightward stroke of the transfer slide. Finally, a switch 128 is provided which is closed by a laterally extending rod 130 on the transfer slide section 76 when the slide reaches the limit of its lefthand stroke.

The operation of the disclosed embodiment is as follows:

At the beginning of the operating cycle, the parts will be in the position of FIG. 8 with the transfer slide at the righthand limit of its stroke and with a terminal position in the transfer slide in alignment with the insertion ram. The operator first closes a foot switch (not specifically shown) which supplies compressed air to the upper end of the piston cylinder 32 driving the insertion ram downwardly. As the ram moves downwardly, the terminal held in the transfer slide is picked up by the lower end of the ram, carried downwardly, and inserted into the printed circuit board 14 on the pedestal 112. When the insertion slide reaches the lower limit of its stroke, the switch 120 is closed and the upper end of the piston cylinder 32 is exhausted while compressed air is supplied to the lower end thereof to cause retraction of the ram. Closure of switch 120 also causes pressurization of the upper end of cylinder 72 to bring about retraction of feed finger 58. When the insertion slide reaches the upper limit of its stroke, the switch 118 is closed and the righthand end of the piston cylinder 82 is pressurized to cause retraction of the transfer slide. When the transfer slide reaches the limit of its stroke, the passageway 86 will be beneath the feed path for the terminal strip 3, and the switch 128 will be closed. Closure of switch 128 caused pressurization of the lower end of piston-cylinder 72 to effect feeding of the terminal strip 3 so that the lending terminal is fed into the transfer slide. At the conclusion of the strip feeding operation, switch 126 is closed by the pin to cuase pressurization of the left hand side of piston-cylinder 82 and movement of transfer slide to the position of FIG. 8.

Advantageously, the width of the passageway 86 is such that after the insertion ram 24 has picked up the terminal and moved a short distance into the passageway, the section 78 of the transfer slide will be cammed rightwardly as viewed in FIGS. 8 and 9 so that the terminal will be released by the two sections of the transfer slide. This arrangement will avoid the imposition of frictional forces on the sides of the terminal by the opposed surfaces of the two parts 76, 78 of the transfer slide while the terminal is being carried towards the printed circuit board. As is apparent from FIGS. 8 and 9, the lower portion of the insertion ram and the upper portion of the recess are contoured to bring about this rightward movement of slide section 78 after the terminal has been firmly seated in the insertion ram.

As previously pointed out, the invention is particularly advantageous for the insertion of simple flat terminals, which may be irregular shape, into printed circuit boards. Terminals of this general type cannot conveniently be passed through a guide tube as can many previous types of terminals when they are inserted into the printed circuit board but they can be firmly gripped by the transfer slide of the instant invention and can be precisely positioned by the transfer slide along the path of movement of the insertion ram.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. Apparatus for inserting terminals into a printed circuit board or the like, said apparatus comprising:

supporting means for supporting said printed circuit board, an inserting ram reciprocable along a first predetermined path towards and away from said supporting means, terminal holding means on said inserting ram for holding one of said terminals on said ram, transfer slide means reciprocable along another predetermined path which intersects said first predetermined path, said transfer slide means having a recess extending therethrough in a direction parallel to the direction of said first path, said recess conforming to the cross section of said inserting ram whereby said inserting ram is permitted to move through said transfer slide means, transfer slide gripping means on said transfer slide means for gripping one of said terminals in said recess, a loading station on said other path, means at said loading station for loading one of said terminals into said transfer slide gripping means and, actuating means for moving said transfer slide means to said loading station, for loading one of said terminal devices into said transfer slide gripping means, for moving said transfer slide to a position in which said recess is on said first path, and for moving said inserting ram along said first path towards said supporting means whereby, a terminal loaded into said transfer slide, is carried to said first path, is engaged by said holding means, is carried by said inserting ram towards said supporting means and is inserted into a printed circuit board on said supporting means.

2. Apparatus as set forth in claim 1 wherein said transfer slide means comprises two sections which are resiliently biased against each other, said recess means extending through said transfer slide means at the abutting ends of two sections, said gripping means comprising opposed surface portions of said sections.

3. Apparatus as set forth in claim 2 wherein said sections abut each other in a plane extending transversely of the longitudinal axis of said transfer slide means.

4. Apparatus as set forth in claim 3 wherein said recess extends into both of said sections between the sides of said transfer means, said terminal being gripped by abutting portions of said sections and extending across said recess.

5. Apparatus for inserting terminals into a printed circuit board or the like, said terminals being in the form of a continuous strip, said apparatus comprising supporting means for supporting a printed circuit board, an inserting ram reciprocable along a first predetermined path towards and away from said supporting means, strip feeding means for feeding a strip of said terminals along a second predetermined path, said second predetermined path being spaced from said first predetermined path, transfer slide means reciprocable along a third predetermined path, said third predetermined path intersecting said first and second paths, said transfer slide means having a recess extending therethrough, said recess conforming to the cross section of said inserting ram, terminal gripping means on said transfer slide means adjacent to said recess, said terminal gripping means being effective to receive and grip one of said terminals when said recess is in alignment with said second path, and means on said inserting slide for grasping a terminal held by said holding means when said recess is in alignment with said first path whereby a terminal transferred from said second path to said first path by said transfer slide is inserted into a printed circuit board supported on said supporting means by said inserting ram.

* * * * *